Dec. 18, 1928.   1,695,484
C. FAYER
SELF STARTING SYNCHRONOUS INDUCTION MOTOR
Filed May 2, 1924
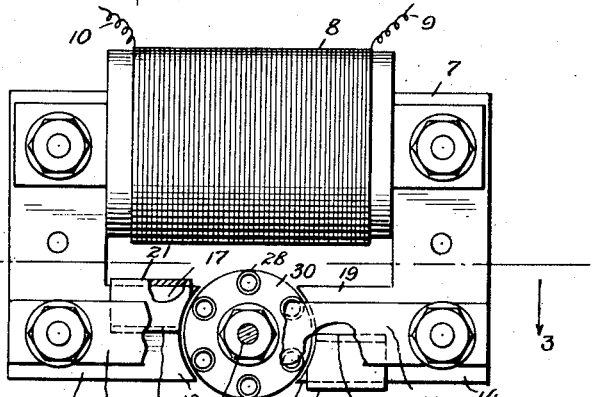
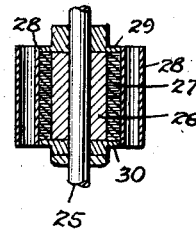
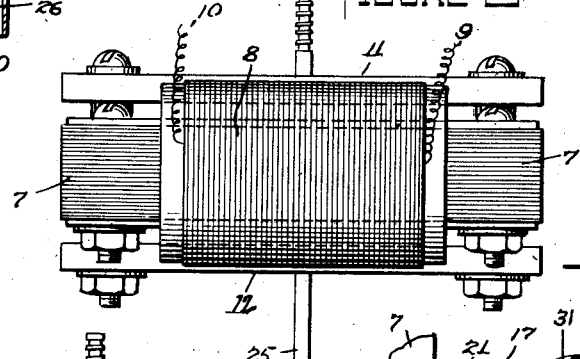
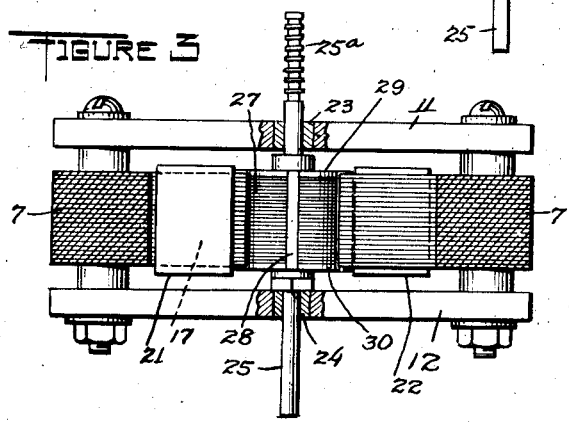
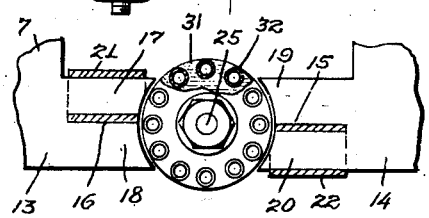
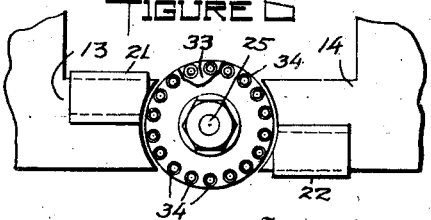
Inventor
Charles Fayer
By his Attorney
Walton Harrison
Witness
M. E. Lessin Patented Dec. 18, 1928.

1,695,484

UNITED STATES PATENT OFFICE.

CHARLES FAYER, OF FLUSHING, NEW YORK, ASSIGNOR TO WAPPLER ELECTRIC COMPANY, INC., A CORPORATION OF NEW YORK.

SELF-STARTING SYNCHRONOUS INDUCTION MOTOR.

Application filed May 2, 1924. Serial No. 710,534.

My invention relates to self-starting synchronous induction motors of a type in which a squirrel cage armature is to rotate in synchronism with phases of the alternating currents whereby the motor is operated.

More particularly stated I seek to produce a motor of the type just mentioned, but in which the rotation of the squirrel cage armature is rendered absolutely synchronous, and in which the starting of the motor is effected quickly, and with certainty.

I also seek to improve the squirrel cage armature, by giving it such construction and arrangement that the magnetic flux and the electric currents passing through it are distributed to better advantage than has been the case with the armatures heretofore employed, and thus improving the general efficiency of the motor.

Heretofore in this art there have been many induction motors invented, and some of them have purported to be both synchronous and self-starting; but the results thus far attained in practice with such motors have not been satisfactory as regards either the actual attainment of perfect synchronism or certainty in starting into action from a state of rest.

Reference is made to the accompanying drawing forming a part of this specification, and in which like reference characters indicate like parts throughout the several figures.

Figure 1 is a side view, partly in elevation and partly in section, showing a typical form of my improved motor.

Figure 2 in a plan view of the mechanism shown in Figure 1.

Figure 3 is a section on the line 3—3 of Figure 1, looking in the direction indicated by the arrows.

Figure 4 is a central section through the squirrel cage armature shown in Figure 1.

Figure 5 is a fragmentary side view, partly in elevation and partly in section, showing my motor as provided with a squirrel cage armature having a larger number of poles than the armature shown in Figure 1.

Figure 6 is a fragmentary side elevation showing my motor as provided with a squirrel cage armature having a larger number of poles than the armature shown in Figure 5.

A laminated field core is shown at 7 and is provided with a field winding 8. The core serves also as a frame for supporting various other parts.

A pair of leads 9 and 10 are connected with the field winding 8, and are used for supplying alternating current thereto.

A pair of side rails are shown at 11 and 12, and are supported upon the core 7.

The core is provided with portions 13 and 14, extending toward each other, and has slots 15 and 16, each pole being thus bifurcated. Thus the pole 13 is provided with two portions 17 and 18, and the pole 14 is provided with two portions 19 and 20. The poles 13 and 14, together with the core 7, are made of magnetic material, preferably soft iron, and are laminated, as shown.

Mounted upon the portion 17 of the pole 13 is an endless band 21, of sheet copper, constituting a self-closed winding of low resistance. A similar band 23 encircles the pole 20 of the pole 14, and performs a service analogous to that of the self-closed winding 21.

The purpose of the self-closed windings 21 and 22 is to render sluggish the magnetism of the portion 17 and 20 of the two pole pieces, and thus to render asymmetrical the magnetism of each of the poles 13 and 14. By rendering the magnetism asymmetrical, the torque is produced for starting the motor into action.

The side rail 11 is provided with a sleeve 23 of insulating material, and the side rail 12 is provided with a similar sleeve 24, the sleeves 23 and 24 being in alinement with each other. A shaft 25 extends through the sleeves 23 and 24, which thus serve as bearings. The shaft 25 is provided with a portion 25$^a$, threaded or otherwise prepared for receiving a pulley or the like, to be carried by the shaft 25.

The shaft 25 is also provided with a portion 26 having a diameter greater than that of the body portion of the shaft. Mounted upon the enlarged portion 26 is a rotor body 27, made of soft iron and laminated, the laminæ crossing the general direction of the axis of the shaft.

The rotor body 27 is provided with a number of tubes 28, made of metal of low ohmic resistance, preferably copper or silver. The tubes 28 are at their ends connected with a pair of end disks 29 and 30, through which they extend. The tubes 28, the disks 29 and 30 and the laminæ of the rotor body 27 are connected together integrally, as by brazing, soldering, fusing or riveting, so as to constitute in effect a single member of practically integral construction, this member being a squirrel cage armature.

The external diameter of any one of the tubes 28 should be less than the width of one of the bands 21, 22.

The shortest distance between the field poles should be greater than the distance between any two consecutive tubes 28, reckoning from their nearest points of proximity.

The face of each portion 17, 18, 19, 20, of the poles must have an arcuate length at least equal to the distance between two consecutive holes in the armature.

In the form of my device shown in Figures 1 to 4 inclusive there are six of the tubes 28, and consequently intermediate the six tubes there are six poles. Owing to the fact that the tubes 28 extend entirely through the rotor body 27, it follows that the armature has as many holes entirely through it as it has tubes or poles.

Alternating current being supplied to the winding 8 by means of the leads 9 and 10, the field poles are energized and currents are generated within the squirrel cage armature, so that the armature is started into action and thereafter continues to rotate, in synchronism with the phases of the alternating current whereby the field winding 8 is energized.

The currents flowing within the squirrel cage armature are somewhat complicated as to number, variety and direction. However, a typical circuit may be traced as follows, reference being had for this purpose to Figure 4. Starting with the tube 28 at the right, the current flows downwardly to the disk 30, where it spreads out and subdivides among all the rest of the tubes; most of it however, going through the tube 28 at the left of the figure, the currents being gathered together in the disk 29 and returning to the tube 28 at the right of the figure. It follows that whenever any particular tube 28 happens for the moment to be energized by a current flowing in a given direction, the particular tube which happens to be diametrically opposite must be energized by a current flowing in the opposite direction. Thus with six tubes and six poles intermediate the tubes, when any particular pole is positive, the pole directly opposite is always negative, and vice versa.

I find that, with the field poles arranged as shown and two in number, the armature poles should be arranged as shown in Figures 1 to 4 inclusive, and in number should be either six or a multiple of six. Thus in Figure 5 the armature 31 is provided with twelve tubes 32, so that in this armature there are twelve poles; and in Figure 6 the armature is shown at 33 and is provided with eighteen tubes 34, so that in the armature here shown there are eighteen poles.

Whether the number of poles in a given armature be six, twelve, eighteen or any other multiple of six, it follows that whatever may be the effect of either one of the field poles upon a particular armature pole or poles in immediate proximity to this field magnet, the opposite field must have a corresponding effect upon the particular armature pole or group of poles immediately adjacent said last-mentioned field magnet.

Thus it will be seen that by giving the armature six, twelve, or eighteen poles, as the case may be, it is maintained in exact symmetry with two of the field poles. If, however, with the field poles arranged as here contemplated the armature be given any number of poles other than six or a multiple of six, there cannot be complete symmetry as between the field and the armature; and consequently there is a loss in the general efficiency of the motor. In addition, the motor will be found deficient in its capacity to start quickly into action, and to remain in synchronism after being started.

I find that in order for the motor to be self-starting and to maintain itself in synchronism with anything like certainty, it is essential that the metallic tubes 28, 32 or 34 and the disks 29 and 30, be used as above described.

In particular, it is desirable that the members 28, 32, and 34, considered as conductors, should each have a tubular form, as shown, and should be of metal having less ohmic resistance than the magnetic material used for the body portion of the armature. It is also very desirable that the disks 29 and 30 be of metal or other material having less ohmic resistance than the soft iron or other material used in the said body portion of the armature.

The weight of the armature is lessened by virtue of the construction described. That is, the armature is lightened by the existence of the holes through it.

The motor above described is found in practice to be absolutely synchonous, in the sense that the armature makes one complete revolution for three, six or nine cycles of the alternating current for six, twelve and eighteen poles respectively; and this means, in practice, that during one complete rotation of the armature any periodical phasal change in the current will always begin with the armature in one predetermined condition, and will always end with the armature in another predetermined position. The fact is that if the phase changes of the current take place uniformly and with perfect regularity, the rotation of the armature is strictly positive; as much so as if the armature were driven by means of gearing, and the gearing driven positively and directly by the prime mover used for generating the current.

I find further that in actual practice the motor may be maintained in perfect synchronism under varying conditions of load, if the electromotive force of the currents supplied to the field winding, and thus used for driving the motor, be varied substantially as the load. For instance if the motor be operating under an electromotive force of fifty volts, and the load upon the motor be increased, say, three to one, the motor still continues to operate synchronously provided the electromotive force be increased to a hundred and fifty volts.

The tubes 28, 32 and 34 above described may be made of other metal than silver or copper. They may be made of any other metal having a low ohmic resistance, approximating that of copper.

I find that if the holes in the rotor are filled with metal plugs of cylindrical form and having low ohmic resistance, the motor operates simply as an induction motor of variable speed. In such case, the conductance of the plugs is too great. If, however, the tubes above described be used, or equivalent members having cross sections smaller than those of solid plugs be employed, then a proper ratio of conductance may be maintained between these members and the surrounding iron of the armature, thus causing the armature to run synchronously.

It appears that the end disks 29, 30, and the tubes connected therewith and extending through the armature constitute loops through which electric currents, developed in the armature as it turns, can pass freely; and that the tubes should be so proportioned that the conductance of each of the loops mentioned must be great, but less than if solid plugs were substituted for the tubes.

As may be understood from the foregoing description my device is an induction-synchronous motor comprising a primary member having means for producing a strongly pulsating, shifting magnetic field, and a secondary member carrying a squirrel cage winding, this squirrel cage winding being composed of tubular conductors of proper cross-section to give the secondary member a salient pole effect.

Thus the tubular conductors are of such cross-section as to give the rotor core a salient pole effect.

It follows that my improved motor has a relatively broad field of utility.

The operation of my device is as follows:

The parts being assembled and arranged as shown in the drawing and as above described, and a circuit being closed through the field winding 8 so as to supply alternating current thereto, the armature begins to rotate in synchronism with phasal changes in the current, and the motor thus acts synchronously so long as alternating current is supplied to the motor and working conditions remain reasonably near normal. Within rather wide limits of operation the synchronism of the motor remains practically perfect, and under extremes of load the synchronism may be maintained by control of the electromotive force of the current supplied to the motor as above described.

I do not limit myself to the precise construction shown, as variations may be made therein without departing from my invention, the scope of which is commensurate with my claims.

Having thus described my invention, what I claim as new and desire to secure by Letters Patent is as follows:

1. A single phase induction-synchronous motor comprising a primary member having means for producing a strongly pulsating, shifting magnetic field, and a secondary member carrying a squirrel cage winding, the squirrel cage winding being composed of tubular conductors of such cross-section as to give the secondary member a salient pole effect.

2. An induction-synchronous motor comprising a primary member having means for producing a strongly pulsating, shifting magnetic field, and a secondary member carrying a squirrel cage winding composed of tubular conductors of such cross-section as to give the secondary member a salient pole effect, said secondary member also carrying discs of conducting material connected with the ends of said tubular conductors.

Signed at Long Island City, N. Y., in the county of Queens and State of New York, this 26th day of April, 1924.

CHARLES FAYER.